3,264,354
METHOD FOR PRODUCTION OF TRI-ALKYL
TERTIARY AMINES
Edward J. Sawyer, Jr., Springboro, Pa., assignor to Archer-Daniels-Midland Company, Minneapolis, Minn., a corporation of Delaware
No Drawing. Filed Aug. 4, 1961, Ser. No. 130,455
6 Claims. (Cl. 260—583)

This invention relates to an improved economical process for preparing tri-alkyl tertiary amines in high production yields. More particularly the improvement concerns a method of obtaining high production yields of tertiary amines from fatty nitriles, primary or secondary fatty amines and mixtures of the same.

The prior art and literature describing the sparging of amines with hydrogen in the process of hydrogenation-dehydrogenation catalysts in the preparation of secondary amines is known. Otherwise, liquid and vapor phase processes utilizing amines or ammonia and alcohol characterized by removal of water of reaction are known. However, it still remains a problem as to providing more economical process means for production of tri fatty alkyl tertiary amines and it is impossible to relatively predict the preparation of such tertiary amines in economically feasible yields. In the known processes, the products obtained from hydrogenation procedures consist essentially of primary amines, secondary amines and mixtures of these amines with only minor amounts of tertiary amines present.

It is accordingly an object of this invention to provide an improved process or procedure for effecting the production of tri-alkyl tertiary amines wherein the alkyl groups are fatty chains of 8–22 carbon atoms and derived from animal, vegetable, marine and like synthetic aliphatics, as derived from mineral oils and the like.

The above and other objects of the present improvement in preparing the defined tri-alkyl tertiary amines are set forth in the following examples which illustrate more clearly the principle and practice of this disclosure, as claimed, to those skilled in the art.

The reactions which occur are essentially as follows:

(I) $RCN + 2H_2 \rightarrow RCH_2NH_2$
(II) $3RCH_2NH_2 \rightarrow (RCH_2)_3N + 2NH_3$ R is an alkyl chain of 8 through 22 carbon atoms preferably of the character derived from the fatty acid portion of fatty oils, fatty acids, fatty esters and similar like chains derived from animal, vegetable, marine and mineral oils, and including rosin acids and the like. Such tertiary amines are known to the art.

The nitriles are formed by conventional processes and the reaction shown by (I) is carried out to form the primary amine or a mixture of primary and secondary amines by well known techniques. The preferred technique employs a nickel catalyst with partial ammonia pressure of 30–70 p.s.i., total hydrogenation pressure of 100–500 p.s.i., and a reaction temperature of 200–300° F. By this process it is possible to obtain primary amine yields of 90% and higher. Upon reducing or eliminating the ammonia and increasing reaction temperature to the range of 300–350° F., it is possible to decrease the proportion of primary amines and significantly increase the amount of secondary amines. As indicated, such process is well known to the art and the production therefrom of octyl to behenyl of mixtures thereof, and like alkyl groups, forming primary and secondary amines is well known in the art.

Essentially, it is desired to incorporate the first reaction as an integrated process with the further reaction herein described. However, the second reaction may be carried out in other equipment, if desired. Thus, when continued from the above process in the same hydrogenation equipment, the amine, after its initial preparation is continuously sparged with hydrogen in the presence of .05% to 5% of a selected catalyst at temperatures of 400°–450° F. and under a pressure of about 0 to about 100 p.s.i., e.g. 50–100 p.s.i. maintained in the unit. Ammonia is removed as the reaction proceeds and forces the reaction to completion.

As indicated, production of such tri-alkyl tertiary amines in more economically commercially feasible yields, has been found possible by utilizing a selective catalyst in the above described process. This catalyst is a supported nickel catalyst and while it may be used, as such, it is preferably in the form of reduced and stabilized, supported nickel catalyst (Girdler Catalysts G–49B) prepared by precipitating nickel upon kieselguhr followed by reduction with hydrogen as indicated this particular catalyst is preferably stabilized, as by oxidation, so as to be non-pyrophoric when exposed to air. The catalyst contains approximately 50% nickel by weight and of this amount approximately half of the nickel is in the reduced stabilized form of finely divided granular material having a bulk density of approximately 25 pounds per cubic foot. This catalyst is produced under license from the Atomic Energy Commission under patents of Ahlberg 2,677,668 and 2,677,669.

The alkyl groups, as indicated, are aliphatic acid chains of 8 through 22 carbon atoms and derived from animal, vegetable, marine and mineral oils, including rosin acids and the like. Such acid chains are generally termed fatty acids and include, for example, pelargonic capric, undecylic, lauric, stearic, behenic, abietic, tall oil acids, sorgic, linoleic, linolenic, and the like saturated and unsaturated aliphatic chains well known to the art.

As indicated, the process herein is preferably a continuation after initial production of the primary and secondary alkyl amines, as described. More specifically, and to illustrate a specific embodiment which is representative of the production of such tri-alkyl tertiary amines, as defined, are the following:

*Example I*

To a tallow secondary amine, prepared by a conventional process in conventional hydrogenation equipment, is added 1% by weight of the defined catalyst. The amine is heated to a higher temperature approximately 450° F. and continuously sparged with hydrogen while maintaining a pressure of approximately 100 p.s.i. Ammonia is removed from the system as the reaction proceeds. When no more ammonia can be removed the reaction is substantially completed and the catalyst is removed by filtering the heated reaction product.

Upon analysis the yield of tri-tallow tertiary amine is on the order of 90% or higher.

*Example II*

1000 gms. of hydrogenated tallow primary amine and 20 gms. of G–49B nickel catalyst were heated in a Paar autoclave at 400° F. and sparged with hydrogen for 16 hours with a pressure of 80 p.s.i.g. maintained in the vessel. After 16 hours a tertiary content of 92.5 percent was obtained.

*Example III*

800 gms. of hydrogenated tallow secondary amine and 16 gms. of G–49B nickel catalyst were charged to a glass flask equipped with mechanical agitation. The material was stirred and heated to 400° F. and sparged with hydrogen for 10 hours. Ammonia and hydrogen were allowed to leave the flask and the pressure was maintained at substantially atmospheric. After 10 hours a tertiary amine content of 88% was achieved. After 16 hours there was substantially no change.

The following examples, prepared by the process herein described show comparative results with the selective catalyst and other hydrogenation catalysts as follows:

| Ex. | Reactant | Catalyst | Product, percent | |
|---|---|---|---|---|
| | | | Tertiary | Secondary |
| IV | Hydrogenated tallow nitriles | 1.0% Girdler G-49B | 92.7 | 4.6 |
| V | Coconut primary amines | ----do---- | 94.6 | 6.8 |
| VI | Coconut primary amine | ----do---- | 97.1 | 6.3 |
| VII | Lauryl primary amines | ----do---- | 88.9 | 7.8 |
| VIII | Lauryl primary amine | ----do---- | 88.0 | 7.8 |
| XI | Hydrogenated tallow primary amine | 0.1% Palladium | 58.2 | 21.8 |
| X | ----do---- | 0.2% Paddadium | 66.9 | 16.8 |
| XI | ----do---- | 2.0% Raney Nickel | (1) | 80 |
| XII | ----do---- | 1.0% Reduced Nickel Formate | 74.9 | 17.2 |
| XIII | ----do---- | 2.5% Girdler G-22 Copper Chromite | (2) | |

[1] Very little.
[2] Very low.

From the above, it will be recognized that this discovery and improvement will now enable the art to more practically and effectively obtain tri-alkyl tertiary amines having 3 carbon chains of 8 to 22 carbon atoms. Such amines are found to have commercial importance in liquid ion exchange mediums particularly useful in extraction process for uranium and rare metals. This improvement provides a new economical procedure for the preparation of high yields of tri-alkyl tertiary amines in conventional process equipment presently utilized for producing primarily aliphatic nitriles, primary and secondary aliphatic amines with only incidental and low yields of tri-alkyl tertiary amines.

Having described the present new embodiment of an improved process for producing tri-alkyl tertiary amines in substantial yields, in accordance with the patent statutes, it will be apparent that some modification and variations, as herein set forth, may be made without departing from the spirit and scope hereof. The specific embodiments described are given by way of examples illustrating the process and improvement provided, which is to be limited only by the terms of the appended claims.

I claim:

1. In a process for producing tri-alkyl tertiary amines having from 8 through 22 carbon atoms in each alkyl group wherein said tertiary amines are derived from a nitrogen-containing material selected from the group consisting of aliphatic nitriles, primary aliphatic and secondary aliphatic amines, and mixtures thereof, the improvement which comprises the steps of forming a mixture of said nitrogen-containing material and a catalytic amount of from about 0.05% to 5% by weight of non-pyrophoric, finely divided, reduced and stabilized form of nickel supported on kieselguhr; heating this mixture at a temperature of from about 400° to about 450° F. while sparging the mixture with hydrogen; maintaining the heated mixture under a pressure of from about 0 to about 100 p.s.i.; and removing ammonia as said tertiary amine is formed until the reaction is substantially completed.

2. The process of claim 1 wherein, the nitrogen containing material is a hydrogenated tallow nitrile.

3. The process of claim 1 wherein, the nitrogen containing material is a hydrogenated tallow amine with not more than 2 alkyl groups.

4. The process of claim 1 wherein, the nitrogen containing material is a hydrogenated coconut amine with not more than 2 alkyl groups.

5. The process of claim 1 wherein, the nitrogen containing material is a hydrogenated lauryl amine with not more than 2 alkyl groups.

6. The process of claim 1 wherein, the nitrogen containing material is a stearyl amine with not more than 2 alkyl groups.

References Cited by the Examiner

UNITED STATES PATENTS

| | | | |
|---|---|---|---|
| 2,355,356 | 8/1944 | Young | 260—583 |
| 2,781,399 | 2/1957 | Shapiro | 260—583 |
| 3,152,185 | 10/1964 | Zvejnieks | 260—383 |

CHARLES B. PARKER, *Primary Examiner.*

M. B. ROBERTO, A. H. SUTTO, *Assistant Examiners.*